S. W. FOSTER.
Grain Separator.
No. 6,920. Patented Dec. 4, 1849.
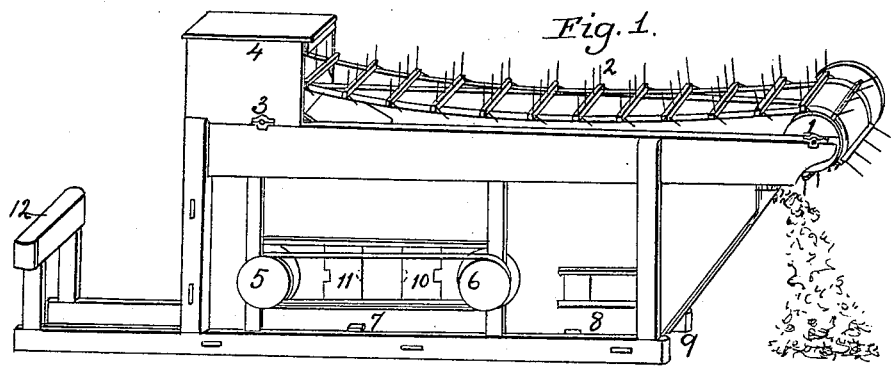
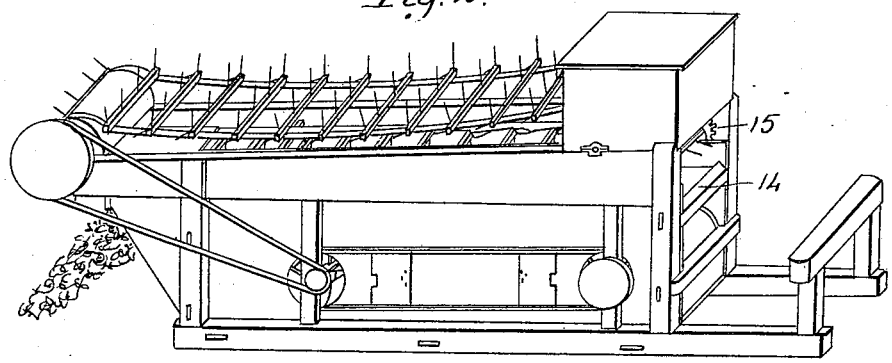
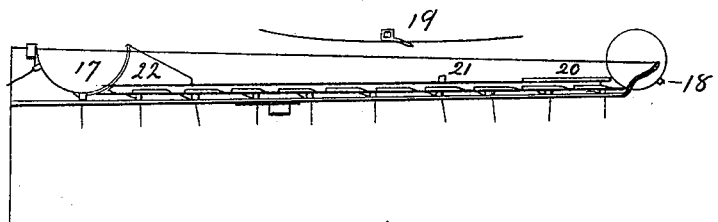
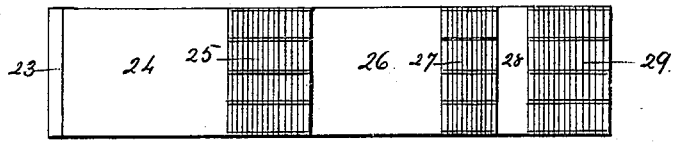

UNITED STATES PATENT OFFICE.

SAMUEL W. FOSTER, OF SCIO, MICHIGAN.

IMPROVEMENT IN GRAIN-SEPARATORS.

Specification forming part of Letters Patent No. 6,920, dated December 4, 1849.

*To all whom it may concern:*

Be it known that I, SAMUEL W. FOSTER, of Scio, in the county of Washtenaw, in the State of Michigan, have invented a new and useful Machine for Separating Grain from the Straw and Chaff when Thrashed; and I do hereby declare that the following is a description of the machine.

The annexed drawings form part of this specification.

A frame is made about three feet wide and twelve feet long and about four feet six inches high, of timber of suitable size, and covered with boards on the sides and partly on the ends, as shown in the accompanying drawings. This frame is floored on the bottom and has another covering twenty-six inches above the floor, consisting partly of boards and partly of rack, as shown by Fig. 4. Under this upper covering are placed two fans or blowers, similar to those used in common fanning-mills, (except that they are stronger,) the ends and whirs of which are shown at 5 and 6, Fig. 1. A covering is placed around these fans in a proper manner to convey the wind they create through the rack, above described, 25 27 29, Fig. 4.

A partition is made in the machine under the floor 26, just at the back end of the rack 25, forward of the fan 6, so as to conduct the wind made by the fan 5 through the rack 25. A partition about one foot high is also made under the short floor 28 to prevent the wheat that falls through the rack 27 from mixing with the shrunk wheat and heads that fall through the rack 29.

A sliding gate is made at 7 and 8, Fig. 1, to let out the wheat at the bottom of the machine, and also at 9 to let out the fine wheat and heads into a basket to be thrashed over.

The drum 17, Fig. 3, (the end of which is seen at 3, Fig. 1,) seventeen inches in diameter, covered with sheet-iron, is placed (the center of it) about twenty inches from the front end of the separator. In front of this cylinder is placed a board about seven inches wide (14, Fig. 2) on a level with the floor 24, standing up to prevent the wheat from flying under the cylinder and toward the farther end of the separator. The thrasher is made fast to the front end of the separator, so that the bottom of the cylinder is just level with the floor 24, Fig. 4. The drum 17, Fig. 3, is covered with a box when in use, properly fitted to the thrasher and with fixings inside, so as entirely to prevent the waste of grain. The drum 1, Fig. 1, eleven inches in diameter, is attached to the top of the frame, so that the bottom of the drum is about nine inches above the floor and racks, Fig. 4. Two belt-straps pass from the drum 1 to drum 3, Fig. 1, one strap at each end of the drums, to which are attached rakes of suitable size to move the straw and grain from the cylinder of the thrasher. On each end of these rakes is a crooked iron 19, which passes under the notched surface, Fig. 3, and causes the rakes to shake as they move, and thereby separate the grain from the straw, which is carried off by the rakes, while the grain falls through the racks 25, 27, and 29, Fig. 4, and the wind, blowing from the fans 5 and 6, Fig. 1, passes up through the racks 25, 27, and 29, Fig. 4, and prevents the falling of the chaff and everything lighter than the grain, by which means the grain is completely separated from the chaff and straw.

What I claim, and desire to secure by Letters Patent, is—

The combination of the raking apparatus with the notched surface, Fig. 3, under which the irons on the ends of the rakes pass, by which means the rakes are caused to shake, which motion of the rakes shakes the straw and thereby separates the grain from it.

Scio, Washtenaw county, Michigan, July 17, 1849.

SAMUEL W. FOSTER.

Witnesses:
   A. D. FOSTER,
   THEODORE FOSTER.